United States Patent
Zhang et al.

(10) Patent No.: US 11,000,837 B2
(45) Date of Patent: May 11, 2021

(54) CATALYST FOR PREPARING CHLORINE GAS BY HYDROGEN CHLORIDE OXIDATION, AND PREPARATION METHOD AND APPLICATION THEREOF

(71) Applicant: Wanhua Chemical Group Co., Ltd., Yantai (CN)

(72) Inventors: Hongke Zhang, Yantai (CN); Bo Zhou, Yantai (CN); Zhangwei Zai, Yantai (CN); Dan Xu, Yantai (CN); Yu Yao, Yantai (CN); Yanlong Xu, Yantai (CN); Dongke Zhao, Yantai (CN); Jingjing Yang, Yantai (CN); Jiansheng Ding, Yantai (CN); Weiqi Hua, Yantai (CN)

(73) Assignee: Wanhua Chemical Group Co., Ltd.

( * ) Notice: Subject to any disclaimer, the term of this patent is extended or adjusted under 35 U.S.C. 154(b) by 105 days.

(21) Appl. No.: 16/306,363

(22) PCT Filed: Aug. 5, 2016

(86) PCT No.: PCT/CN2016/093559
§ 371 (c)(1),
(2) Date: Nov. 30, 2018

(87) PCT Pub. No.: WO2018/023717
PCT Pub. Date: Feb. 8, 2018

(65) Prior Publication Data
US 2019/0291087 A1    Sep. 26, 2019

(30) Foreign Application Priority Data
Aug. 3, 2016  (CN) .......................... 201610625612.9

(51) Int. Cl.
| | |
|---|---|
| B01J 21/04 | (2006.01) |
| B01J 21/06 | (2006.01) |
| B01J 21/08 | (2006.01) |
| B01J 21/12 | (2006.01) |
| B01J 21/16 | (2006.01) |
| B01J 21/18 | (2006.01) |
| B01J 23/00 | (2006.01) |
| B01J 23/10 | (2006.01) |
| B01J 23/26 | (2006.01) |
| B01J 23/34 | (2006.01) |
| B01J 23/83 | (2006.01) |
| B01J 23/86 | (2006.01) |
| B01J 23/889 | (2006.01) |
| B01J 29/46 | (2006.01) |
| B01J 29/48 | (2006.01) |

(Continued)

(52) U.S. Cl.
CPC ............ *B01J 29/166* (2013.01); *B01J 23/83* (2013.01); *B01J 29/48* (2013.01); *B01J 35/023* (2013.01); *B01J 35/1019* (2013.01); *B01J 35/1023* (2013.01); *B01J 37/009* (2013.01); *B01J 37/0018* (2013.01); *B01J 37/0036* (2013.01); *B01J 37/02* (2013.01); *B01J 37/0205* (2013.01); *B01J 37/0236* (2013.01); *B01J 37/04* (2013.01); *B01J 37/08* (2013.01); *C01B 7/04* (2013.01); *B01J 2229/20* (2013.01)

(58) Field of Classification Search
CPC . B01J 21/04; B01J 21/06; B01J 21/063; B01J 21/066; B01J 21/08; B01J 21/12; B01J 21/16; B01J 21/18; B01J 21/185; B01J 23/002; B01J 23/10; B01J 23/26; B01J 23/34; B01J 23/83; B01J 23/86; B01J 23/868; B01J 23/8892; B01J 29/46; B01J 29/48; B01J 29/166; B01J 35/023; B01J 35/1019; B01J 35/1023; C01B 7/04
See application file for complete search history.

(56) References Cited

U.S. PATENT DOCUMENTS

| | | | | |
|---|---|---|---|---|
| 5,094,990 A | * | 3/1992 | Sasaki ................... | B01J 23/002 423/376 |
| 5,132,269 A | * | 7/1992 | Sasaki ................... | B01J 23/881 502/205 |

(Continued)

FOREIGN PATENT DOCUMENTS

| | | |
|---|---|---|
| CN | 101125297 A | 2/2008 |
| CN | 102000583 A | 4/2011 |

(Continued)

OTHER PUBLICATIONS

Extended European Search Report including Written Opinion for Application No. 16911312.3 dated Nov. 8, 2019, 10 pages.

(Continued)

*Primary Examiner* — Cam N. Nguyen
(74) *Attorney, Agent, or Firm* — Lerner, David, Littenberg, Krumholz & Mentlik, LLP

(57) ABSTRACT

A catalyst for preparing chlorine gas by hydrogen chloride oxidation, comprising the following components calculated according to mass content based on the total weight of the catalyst: 0.5-20 wt % copper; 2-10 wt % manganese; 0.05-2 wt % boron; 0.01-3 wt % chromium; 0.1-10 wt % rare earth metal; 0.1-10 wt % potassium; and 3-15 wt % titanium; also comprising 0.02-1.1 wt % phosphorus; and 0.03-1.9 wt % iron; the carrier content is 55-90 wt %. In the case of a fluidized bed reactor, the present catalyst can achieve a one-way hydrogen chloride conversion rate of 80-85%. Almost all of the 0-1000 mg/kg of chlorinated benzene contained in hydrogen chloride gas can be converted into $CO_2$ and $H_2O$ without generating polychlorinated benzene.

20 Claims, No Drawings

(51) Int. Cl.
 B01J 29/16 (2006.01)
 B01J 35/02 (2006.01)
 B01J 35/10 (2006.01)
 C01B 7/04 (2006.01)
 B01J 37/00 (2006.01)
 B01J 37/02 (2006.01)
 B01J 37/04 (2006.01)
 B01J 37/08 (2006.01)

(56) References Cited

U.S. PATENT DOCUMENTS

| | | | | |
|---|---|---|---|---|
| 5,182,249 | A * | 1/1993 | Wang | B01J 23/10 502/303 |
| 5,380,692 | A * | 1/1995 | Nakatsuji | B01D 53/9418 502/241 |
| 6,033,632 | A * | 3/2000 | Schwartz | B01D 53/326 422/617 |
| 6,569,803 | B2 * | 5/2003 | Takeuchi | B01D 53/944 502/328 |
| 6,653,496 | B1 * | 11/2003 | Mori | B01J 23/002 502/205 |
| 7,229,945 | B2 * | 6/2007 | Kauffman | B01J 23/002 502/104 |
| 7,288,669 | B2 * | 10/2007 | Gaffney | B01J 23/002 502/312 |
| 7,365,041 | B2 | 4/2008 | Miyaki et al. | |
| 7,807,600 | B2 * | 10/2010 | Watanabe | B01J 23/002 502/255 |
| 7,902,112 | B2 * | 3/2011 | Yanagita | B01J 37/0045 502/241 |
| 8,721,996 | B2 * | 5/2014 | Hechler | C07C 5/333 422/641 |
| 8,721,997 | B2 * | 5/2014 | Hechler | C22C 30/00 422/641 |
| 2004/0031730 | A1 * | 2/2004 | Gislason | B01J 20/106 208/245 |
| 2004/0248734 | A1 * | 12/2004 | Miyaki | B01J 23/8993 502/311 |
| 2006/0199730 | A1 * | 9/2006 | Seely | C07C 253/26 502/246 |
| 2007/0249496 | A1 * | 10/2007 | Wagner | B01J 23/10 502/303 |
| 2009/0292153 | A1 * | 11/2009 | Cai | C07C 5/48 585/663 |
| 2010/0202959 | A1 * | 8/2010 | Wolf | B01J 23/12 423/502 |
| 2010/0266481 | A1 * | 10/2010 | Haas | C01B 7/04 423/502 |
| 2011/0105630 | A1 * | 5/2011 | Domer | B01J 35/002 518/700 |
| 2011/0268649 | A1 | 11/2011 | Henze et al. | |
| 2013/0288884 | A1 | 10/2013 | Yi et al. | |
| 2015/0111729 | A1 * | 4/2015 | Princivalle | B01J 23/002 502/304 |
| 2016/0175818 | A1 * | 6/2016 | Choi | B01J 37/08 562/534 |
| 2017/0001178 | A1 | 1/2017 | Lou et al. | |
| 2019/0009252 | A1 * | 1/2019 | Chi | B01J 23/8878 |

FOREIGN PATENT DOCUMENTS

| | | |
|---|---|---|
| CN | 101559374 B | 9/2011 |
| CN | 104549360 A | 4/2015 |
| CN | 104785271 A | 7/2015 |
| CN | 105126930 A | 12/2015 |
| EP | 2481478 A1 | 8/2012 |
| WO | 2010076262 A1 | 7/2010 |

OTHER PUBLICATIONS

International Search Report PCT/CN2016/093559 dated Mar. 1, 2017.

* cited by examiner

CATALYST FOR PREPARING CHLORINE GAS BY HYDROGEN CHLORIDE OXIDATION, AND PREPARATION METHOD AND APPLICATION THEREOF

CROSS REFERENCE TO RELATED APPLICATIONS

The present application is a national phase entry under 35 U.S.C. § 371 of International Application No. PCT/CN2016/093559, filed Aug. 5, 2016, which claims priority from Chinese Patent Application No. 201610625612.9 filed Aug. 3, 2016, all of which are hereby incorporated herein by reference.

TECHNICAL FIELD

The present invention belongs to the field of catalysts, and in particular relates to a catalyst for preparing chlorine gas by hydrogen chloride oxidation, especially to a catalyst for preparing chlorine gas by oxidation of hydrogen chloride containing chlorinated benzene, and a preparation method and an application of the catalyst.

TECHNICAL BACKGROUND

The low atomic utilization of "chlorine" resources is very common in the chlorine involved industries. For example, in the phosgene process for preparing isocyanates, none of the chlorine atoms enter the final product through the "chlorine gas-phosgene-hydrogen chloride" open route and are entirely discharged as hydrogen chloride. In the traditional industry, chlorine gas mainly comes from the chlor-alkali industry with high electricity consumption. The by-product hydrochloric acid is less valuable as it contains more impurities such as organic substances, and it generates large amounts of waste water during use. Therefore, chlorine gas is prepared through the catalytic oxidation of hydrogen chloride, thereby forming a closed-loop utilization of "chlorine" resources, which has received increasing attention.

In the production processes of isocyanates in terms of MDI, TDI, and ADI, chlorobenzene or o-dichlorobenzene is generally used as a solvent for photochemical reaction. The by-product hydrogen chloride often contains tens to one thousand mg/kg of chlorobenzene or o-dichlorobenzene. Under the catalyst and effective catalytic reaction conditions disclosed in our previous patent CN201010567038.9, most of these chlorinated benzene impurities are converted into polychlorinated benzenes with high-melting point and high-boiling point, especially hexachlorobenzene and pentachlorobenzene. Hexachlorobenzene accounts for more than 80%, hexachlorobenzene and pentachlorobenzene account for more than 95%. These polychlorinated benzenes will gradually accumulate in the heat exchanger behind the reactor, which seriously disturbs the stability of the hydrogen chloride catalytic oxidation process. Moreover, the United Nations has listed hexachlorobenzene as one of the first 12 persistent pollutants (POPs) in the 2001 Stockholm Convention, and China's Ministry of Environmental Protection issued an announcement, No. 23 of 2009, that from May 17, 2009, production, circulation, use, import and export of hexachlorobenzene are prohibited in China.

To solve the problem, the common method adopted in the process is to reduce the content of chlorobenzene or o-dichlorobenzene in the raw material hydrogen chloride, by cryogenic separation and adsorption with an adsorbent. These methods are effective, however, additional investment in fixed assets and operating costs increased, as a result, the cost of a ton of chlorine gas increases by about 20-50 yuan, which is more difficult to accept as chlorine gas is relatively cheap.

Optimization of the previous catalyst guarantees the excellent performance in catalytic combustion of chlorobenzene or o-dichlorobenzene and sufficient hydrogen chloride oxidation activity, by which the problem can be solved with little increase in the cost. This is an idea that can solve the problem with little additional cost. CN101559374B discloses a bi-functional catalyst and its preparation method and application. The disclosed catalyst system is provided with two functions: hydrogen chloride oxidation and deep oxidation of "one or more of cyclohexane, benzene and toluene" volatile pollutants (VOCs). Among them, the conversion rate of hydrogen chloride by hydrogen chloride oxidation can reach 83-84%, and the conversion rate of specified VOCs can reach 87%. However, the patent does not explicitly analyze and introduce the products of deep oxidation of VOCs, and whether it is suitable for the oxidation of hydrogen chloride rich in chlorobenzene or o-dichlorobenzene is not described. We have verified that the catalyst is similar to our previous patent CN102000583B in terms of the ability of catalyzing the oxidation of hydrogen chloride rich in chlorobenzene or o-dichlorobenzene, it mainly transforms the impurities, chlorobenzene or o-dichlorobenzene to polychlorinated benzene.

Under these backgrounds, the present invention provides a novel bi-functional catalyst, which has excellent ability of catalyzing the oxidation reaction of hydrogen chloride while has the ability to catalyze the incineration of chlorobenzene or o-dichlorobenzene.

SUMMARY OF THE INVENTION

One of the objects of the present invention is to provide a catalyst for preparing chlorine gas by hydrogen chloride oxidation.

Another object of the present invention is to provide a catalyst suitable for preparing chlorine gas by oxidation of hydrogen chloride containing chlorobenzene; the catalyst has a good catalytic activity for oxidation of hydrogen chloride and also has the good catalytic activity for incineration of chlorobenzene. The catalyst is especially suitable for the hydrogen chloride raw materials which are rich in chlorobenzene and/or o-dichlorobenzene, and can efficiently carry out catalytic incineration of chlorobenzene and/or o-dichlorobenzene while efficiently converting hydrogen chloride into chlorine gas.

Another object of the present invention is to provide a preparation method for a catalyst of preparing chlorine gas by hydrogen chloride oxidation. To achieve the above objects, the technical solutions of the present invention are as follows:

A catalyst for preparing chlorine gas by hydrogen chloride oxidation, comprising a copper element, a manganese element, a boron element, a chromium element, a rare-earth element, a potassium element, a titanium element, a phosphorus element, an iron element and a carrier. The catalyst is obtained after forming in the presence of the aforementioned components and under the action of a binder.

Wherein, a copper element, a manganese element, a boron element, a chromium element, a rare-earth element, a potassium element and a titanium element are present in the catalyst in the form of compounds, especially in the form of oxides or metal salts (preferably chlorides); a phosphorous element and an iron element are present in the catalyst in the form of iron phosphate. The oxide or metal salt mentioned herein does not in particularly refer to a pure compound, but refers to a form of various metals bonded in a certain chemical state to an oxygen element, an anion element of a metal salt (for example, chlorine) and the like by a chemical bond. The form can be one oxygen atom or chlorine atom bonded to only one metal atom, or one oxygen atom or chlorine atom bonded to more than one metal atom. And vice versa, one metal atom can be bonded to one, two or more oxygen or chlorine atoms.

The binder is selected from the group consisting of aluminum sol, activated aluminum oxide, silica sol, kaolin, clay, pseudoboehmite, silicate ester, titanate ester, potassium water glass (potassium silicate) and diatomite, and combinations thereof. Generally, the binder does not exist in the final catalyst by its original form. Instead, after the calcination treatment of a certain time under a certain temperature, the binder may be present in the catalyst as residues in the forms of possible but not limited to silicon oxide, aluminum oxide, titanium oxide, silicates, aluminates, titanates and other corresponding oxides and salts.

On the basis of the total mass of the catalyst, the mass content of each element in the catalyst is: copper, 0.5-20 wt %, preferably 2-10%; manganese, 2-10 wt %, preferably 2-5 wt %; boron, 0.05-2 wt %, preferably 0.06-1.0 wt %; chromium, 0.01-3.0 wt %, preferably 0.02-2.0 wt %; rare-earth metal, 0.1-10 wt %, preferably 0.5-3.0 wt %; potassium, 0.1-10 wt %, preferably 0.2-2.5 wt %; titanium, 3-15 wt %, preferably 4-14 wt %; and phosphorus, 0.02-1.1 wt %, preferably 0.03-0.50 wt %; iron, 0.03-1.9 wt %, preferably 0.04-1.0 wt %; the content of carrier is 55-90 wt %, preferably 70-90 wt %, respectively, wherein the rare-earth metal element is preferably one or both of cerium and lanthanum. The amount of residue of the binder after calcination is accounted in the weight of the carrier in calculation.

The carrier is selected from the group consisting of molecular sieves, kaolin, diatomite, silica, alumina, titania, zirconia, activated carbon, silicon carbide, carbon black, carbon fibers and carbon nanotubes, and combinations thereof.

Various elements can be applied to the carrier in various ways, including but not limited to impregnation, hot melt dispersion and chemical deposition, preferably impregnation.

The present invention provides a catalyst preparation method for preparing chlorine gas by hydrogen chloride oxidation, which comprises the following steps:

(1) A copper-containing compound and a manganese-containing compound are dissolved in a solvent. The copper-containing compound and the manganese-containing compound described in step (1) generally refer to a copper salt and a manganese salt that are soluble in a solvent such as water or dilute nitric acid and can be, but are not limited to, nitrates, chlorides, acetates. A carrier is added to the dissolved copper- and manganese-containing solution. The carrier herein may be a molecular sieve, and the specific surface area of the molecular sieve is 300-600 m$^2$/g; the average particle size of the molecular sieve is 0.1-10 μm and the maximum particle size is up to 50 μm, preferably the average particle size is 0.5-2 μm and the maximum particle size is up to 10 μm. In general, commonly used molecular sieves such as aluminosilicate molecular sieves, titanium silicalite molecular sieves and pure-silica molecular sieves are all suitable, and these molecular sieves can also be subjected to certain physical and chemical treatments to endue them with some special physical and chemical properties.

The upper limit of the amount of the solvent, such as the amount of water and the amount of nitric acid, is not particularly limited, and the requirement for the lower limit is to allow the copper-containing compound and the manganese-containing compound to be completely dissolved and to allow the added carrier to be completely submerged. For energy conversation and environmental protection, the solvents such as nitric acid and water should be as little as possible under the premise of fulfilling the above two requirements. The $NO_x$ produced by nitric acid during a high-temperature treatment pollutes the atmosphere, and water evaporation absorbs a lot of heat. In step (1), the weights of the carrier, the copper-containing compound (calculated according to the content of copper), and the manganese-containing compound (calculated according to the content of manganese) are: 15-100 parts of the carrier, 4-8 parts of the copper-containing compound (calculated according the content of copper), and 1-10 parts of manganese-containing compound (calculated according to the content of manganese), respectively. After the carrier is thoroughly mixed and infiltrated with the solution, a solid with moisture content up to 10% by weight will be obtained after drying. The solid is then calcined. In the calcination process, the calcination temperature is in the range of 300-650° C., preferably 450-650° C., and the calcination time is 30-120 minutes. In order to ensure the homogeneity of the calcination and reduce the energy loss, it is advantageous to allow the solids in powder forms of a certain degree before calcinating the solids. The calcined solid is cooled and the solid is preferably placed in an environment where the relative humidity is up to 40%, preferably up to 30% when it is cooled. The solid is then pulverized in an environment where the relative humidity is up to 40%, preferably up to 30%. The finer the powder obtained by pulverization, the better. Specifically, the powder with an average particle size of 10-100 μm and a maximum particle size up to 500 μm is required. In order to ensure this particle size requirement, the sieving process can be added after pulverization. The powder obtained is named Powder A and it is placed in an environment where the relative humidity is up to 40%, preferably up to 30%, and set aside.

(2) A boron-containing compound, a potassium-containing compound and a rare-earth metal-containing compound are dissolved in a solvent such as water or dilute nitric acid. The requirements for the amount of solvent (such as the amount of water and the amount of nitric acid) are the same as those in step (1). The boron-containing compound described in step (2) is selected from the group consisting of boric acid, sodium borate and potassium borate, and combinations thereof. The potassium-containing compound and the rare-earth metal-containing compound generally refer to potassium salts and rare-earth metal salts that are soluble in solvents such as water or dilute nitric acid, and may be, but are not limited to, nitrates, chlorides and acetates. The rare-earth metal element is preferably one or both of cerium and lanthanum. The Powder A obtained in step (1) is added to the above-mentioned solution containing boron, potassium and rare=earth metal.

In step (2), the weight contents of the Powder A, the boron-containing compound (calculated according to the content of boron), the potassium-containing compound (calculated according to the content of potassium) and the rare-earth metal-containing compound (calculated according to the content of rare-earth metal) are 50-200 parts of Powder A, 1-2 parts of boron-containing compound (calculated according to the content of boron), 2-10 parts of potassium-containing compound (calculated according to the content of potassium) and 1-10 parts of rare-earth metal-containing compound (calculated according to the content of rare-earth metal), respectively. After Powder A is sufficiently mixed and infiltrated with the solution, a solid with moisture content up to 10 wt % will be obtained after drying. The solid is then calcined. In the calcination process, the calcination temperature is 300-650° C., preferably 450-650° C., and the calcination time is 30-120 minutes. In order to ensure the homogeneity of the calcination and reduce the energy loss, it is advantageous to allow the solids in powder forms of a certain degree before calcination. The calcined solid is cooled and the solid is preferably placed in an environment where the relative humidity is up to 40%, preferably up to 30% when it is cooled. The solid is then pulverized under the environment where the relative humidity is up to 40%, preferably up to 30%. The finer the pulverized powder is, the better property the powder gets. Specifically, the average particles size of powder should be 10-100 μm and the maximum particle size should be up to 500 μm. To guarantee the requirement, the sieving process may be added after pulverization. The powder obtained is named Powder B and it is placed it in an environment where the relative humidity is up to 40%, preferably up to 30%, and set aside.

(3) A copper-containing compound, a chromium-containing compound and a manganese-containing compound are dissolved in a solvent such as water or dilute nitric acid. The copper-containing compound, the chromium-containing compound and the manganese-containing compounds described in step (3) generally refer to copper salts, chromium salts and manganese salts that are soluble in a solvent (such as water or dilute nitric acid), but they may be, but are not limited to nitrates, chlorides and acetates thereof. Titanium dioxide and iron phosphate are added to the solution containing copper, chromium and manganese, and the titanium dioxide is preferably titanium dioxide having an anatase crystal structure. Preferably, the titanium dioxide has an average particle size of 0.1-10 μm and a maximum particle size up to 50 μm, preferably an average particle size of 0.2-3 μm and a maximum particle size up to 15 μm. In step (3), the upper limit of the amount of solvent (such as water and nitric acid) is not particularly limited, and the requirement for lower limit requirement is to allow the copper-containing compound, the chromium-containing compound and the manganese-containing compound to be completely dissolved and to allow the added titanium dioxide and iron phosphate to be completely submerged. From the viewpoint of energy conservation and environmental protection, the amount of solvents such as nitric acid and water should be as small as possible on the premise of fulfilling the above two requirements. Because $NO_x$ formed from nitric acid during a high-temperature treatment will pollute the atmosphere, and water evaporation will absorbs a large amount of heat.

In step (3), the iron phosphate can be synthesized, or purchased from the market. The method of synthesis can be, but is not limited to the following: the desired iron (trivalent)-containing compound and phosphorus-containing compound are separately dissolved in water. The iron (trivalent)-containing compound mentioned herein generally refers to the iron (trivalent) salts that are soluble in water but it may be, but is not limited to nitrates, chlorides and acetates, preferably nitrates. The phosphorus-containing compound mentioned herein generally refers to one, two or three of ammonium phosphate, ammonium hydrogen phosphate and ammonium dihydrogen phosphate; the solution of the phosphorus-containing compound is added to the iron (trivalent)-containing compound during stirring; the ratio of iron element to phosphorus element is not limited. However, in order to reduce waste, preferably the atomic ratios of them are relatively close or even equal. The precipitate is taken out and dried to obtain a solid with moisture content up to 5 wt %. The solid is then calcined. In the calcinations process, the calcination temperature is 450-850° C., preferably 550-750° C., and the calcination time is at least 60 minutes. In order to ensure the homogeneity of the calcination and reduce the energy loss, it is advantageous to allow the solids in powder forms of a certain degree before calcination. The calcined solid is cooled and the solid is preferably placed in an environment where the relative humidity is up to 40%, preferably up to 30% when it is cooled. The solid is then pulverized under an environment where the relative humidity is up to 40%, preferably up to 30%. The finer the pulverized powder is, the better property the powder gets. Specifically, the powder is required to have an average particle size of 10-100 μm and a maximum particle size up to 500 μm. To guarantee the particle size requirement, the sieving process may be added after pulverization. Therefore, the powder obtained is an iron phosphate powder, which can be placed in an environment where the relative humidity is up to 40%, preferably up to 30%, and set aside when the powder is not needed temporarily.

The weights of titanium dioxide, iron phosphate, copper-containing compound (calculated according to the content of copper), chromium-containing compound (calculated according to the content of chromium) and manganese-containing compound (calculated according to the content of manganese) described in step (3) are 50-300 parts of titanium dioxide, 0.1-10 parts of iron phosphate, 0.1-2 parts of copper-containing compound (calculated according to the content of copper), 0.1-2 parts of chromium-containing compound (calculated according to the content of chromium) and 4-30 parts of manganese-containing compound (calculated according to the content of manganese), respectively. When titanium dioxide and iron phosphate are sufficiently mixed and infiltrated with a solution, a solid with moisture content up to 5 wt % is obtained by drying. The solid is then calcined. In the calcination process, the calcination temperature is 450-850° C., preferably 550-750° C., and the calcination time is 60-120 minutes. To guarantee the homogeneity of the calcination and reduce the energy loss, it is advantageous to allow the solids in powder forms with a certain degree before calcination. The calcined solid is cooled and the solid is preferably placed in an environment where the relative humidity is up to 40%, preferably up to 30% when it is cooled. The solid is then pulverized under an environment where the relative humidity is up to 40%, preferably up to than 30%. The finer the powder obtained by pulverization, the better. Specifically, the powder with an average particle size of 10-100 μm and a maximum particle size up to than 500 μm is required. To guarantee the requirement, the sieving process may be added after pulverization. The powder obtained is named Powder C and it is placed in an environment where the relative humidity is up to 40%, preferably up to 30%, and set aside.

(4) Powder B, Powder C, carrier, binder, and a suitable amount of solvent (such as water) are mixed evenly. The content by weight of each component in step (4) is 5-30 parts of Powder B, 10-30 parts of Powder C, 10-40 parts of carrier and 10-55 parts of binder (calculated according o the content of the residue after calcination), respectively.

Wherein, the suitable amount of solvent, such as water, contains water carried in other various materials. The solid content of the evenly mixed materials is 20-50 wt %, preferably 25-40 wt %. The materials are then dried, calcined, sieved and cooled to obtain the final catalyst product.

In step (4), the carrier is selected from the group consisting of molecular sieve, kaolin, diatomite, silica, alumina, titania, zirconia, activated carbon, silicon carbide, carbon black, carbon fiber and carbon nanotubes, and combinations thereof. Carriers have an average particle size of 0.1-10 μm and a maximum particle size up to 50 μm, preferably an average particle size of 0.2-3 μm and a maximum particle size up to 15 μm.

In step (4), the binder is selected from the group consisting of aluminum sol, activated aluminum oxide, silica sol, kaolin, clay, pseudoboehmite, silicate ester, titanate, potassium water glass (potassium silicate), diatomite, nitric acid and phosphoric acid, and combinations thereof. The viscosity of the evenly mixed material is 1000-30000 mPa·s, preferably 1100-5000 mPa·s and particularly preferably 1200-3000 mPa·s.

In step (4), the materials are dried preferably by spray drying method to obtain a powder with moisture content up to 10 wt %. The powder is then quickly sent to a calcinator for calcination. In the calcination process, the calcination temperature is 300-650° C., preferably 450-550° C., and the calcination time is 60-180 minutes. In order to ensure the homogeneity of the calcination, it is advantageous to properly stir the powder during calcination. The calcined powder is cooled, and the powder is preferably placed under an environment where the relative humidity is up to 40%, preferably up to 30% during the cooling process. According to the requirements of the reactor, the cooled powder is sieved to obtain the final catalyst product. The catalyst is placed in an environment where the relative humidity is up to 40%, preferably up to 30%, and set aside.

The present invention also relates to use of the aforementioned catalyst and the catalyst prepared by the aforementioned preparation methods in a method for preparing chlorine gas by oxidizing hydrogen chloride.

The catalyst of the present invention can be used to oxidize hydrogen chloride to prepare chlorine gas, and it is particularly suitable for oxidizing hydrogen chloride containing chlorobenzene to prepare chlorine gas, more particularly suitable for oxidizing hydrogen chloride containing 0-1000 mg/kg, preferably 100-800 mg/kg of chlorobenzene to prepare chlorine gas, and especially suitable for oxidizing hydrogen chloride containing either or both of 100-800 mg/kg of chlorobenzene or o-dichlorobenzene to prepare chlorine gas. During the process of using the catalyst for oxidizing hydrogen chloride to prepare chlorine gas, the process conditions are as follows: the highest temperature (hot-spot temperature) in the reactor is 320-500° C., preferably 350-450° C., and the space velocity of hydrogen chloride is 0.05-1.0 h$^{-1}$. The molar ratio of hydrogen chloride to oxygen is from 1:1 to 4:1, the reaction pressure is from atmospheric pressure to 5 atmospheric pressure (absolute pressure), and the reaction is conducted in a fluidized bed. When hydrogen chloride is oxidized to prepare chlorine gas under the above conditions, the conversion rate of hydrogen chloride reaches 80-85%, the conversion rate of chlorobenzene and/or o-dichlorobenzene is more than 95%, and the concentration of any one or more of trichlorobenzene, tetrachlorobenzene, pentachlorobenzene and hexachlorobenzene in the tail gas of the reaction is less than 5 mg/kg.

The present invention has the beneficial effects as follows:

The catalyst of the present invention can achieve a one-way hydrogen chloride conversion rate of 80-85% in the preparation of chlorine gas by hydrogen chloride oxidation. For the 0-1000 mg/kg of chlorobenzene contained in hydrogen chloride gas, almost all of the chlorobenzene can be converted to $CO_2$ and $H_2O$ without generating polychlorinated benzene. The problem that the process stability is influenced by the accumulation of polychlorinated benzene with a high-boiling temperature in the heat exchanger can be effectively solved.

EMBODIMENTS

The embodiments of the present invention will be further illustrated with combination of the examples as follows. It should be noted that the present invention is not limited to the listed examples, but also includes any other well-known changes within the protection scope of the claimed invention.

Test Method of the Conversion Rate of Hydrochloric Acid:

(1) Detection Principle $$Cl_2+2KI=2KCl+I_2$$

$$I_2+2Na_2S_2O_3=2NaI+Na_2S_4O_6$$

$$HCl+NaOH=NaCl+H_2O$$

(2) Preparation and Calibration of 0.1 mol/L $Na_2S_2O_3$ Solution

About 6.2 g of $Na_2S_2O_3 \cdot 5H_2O$ is weighed, dissolved in a suitable amount of freshly boiled and freshly cooled distilled water ($O_2$ and $CO_2$ are removed in water), 0.05-0.1 g of $Na_2CO_3$ (microorganisms are inhibited) is added, and 250 mL of solution is prepared and placed in a brown bottle, saved in the dark; the solution is placed for 1-2 weeks before calibration.

0.15 g of $K_2Cr_2O_7$ (dried at 110° C. for 2 h) is accurately weighed in an iodine flask, 10-20 mL of water is added to dissolve the $K_2Cr_2O_7$, 2 g of KI and 10 mL of $H_2SO_4$ are added and are shaken well for 5 minutes, then are diluted with 50 mL of water, and are titrated with $Na_2S_2O_3$ solution until the solution turns light yellow-green, at that time 2 mL of starch indicator is added. The mixture is continuously titrated with $Na_2S_2O_3$ solution until the solution changes from blue to light green (end point is very light green shown by $Cr^{3+}$). Parallel calibration is carried out for 3 times to take the average of the 3 times.

(3) Analysis and Detection Process a) Sampling: a 250 mL sampling bottle is displaced with the sample gas to be tested for 3 minutes (the gas enters from the bottom and is discharged from the top) to ensure that there are no impurities in the sample bottle. The sample gas in the sample bottle sufficiently reacts with KI. $Cl_2$ in the sample gas reacts with KI to form $I_2$ (dissolves in the form of $I^{3-}$ in the absorption liquid; if $I_2$ precipitation occurs, the accuracy of the result is likely to be poor and resampling is required), after HCl is absorbed, aqueous hydrochloric acid is formed. Then titration is carried out.

b) Titration of $I_2$ ($I^{3-}$) in the absorption liquid: 25.00 mL of the absorption liquid is taken into a 250 mL conical flask, diluted with 50 mL of distilled water, titrated with the prepared and calibrated $Na_2S_2O_3$ solution until a light yellow color is shown, 2 mL of starch solution is added, the mixture is titrated continuously until the blue color just disappears, which is the end point. The volume of $Na_2S_2O_3$ solution consumed by titration is recorded, the content of $I_2$ ($I^{3-}$) in the absorption liquid can be calculated, and then the amount of $Cl_2$ in the sample gas is calculated.

c) Titration of hydrochloric acid in the absorption liquid: 2-3 drops of phenolphthalein reagent is added to the sample obtained after the completion of the titration in step b), then it is titrated with the prepared and calibrated NaOH standard solution until a red color is shown and the color does not change within half a minute, which is the titration end point. The volume of the NaOH standard solution consumed by titration is reported, the content of $H^+$ in the absorption liquid can be calculated, and then the amount of HCl in the sample gas is calculated.

(4) Hydrogen chloride conversion rate in the sample is calculated as follows:

$$Conv = \frac{a \cdot b \times 10^{-3}}{a \cdot b \times 10^{-3} + c \cdot d \times 10^{-3}} \times 100\%$$

wherein:
a represents the concentration of $Na_2S_2O_3$ solution, mol/L;
b represents the volume of $Na_2S_2O_3$ solution consumed by titration, mL;
c represents the concentration of NaOH standard solution, mol/L;
d represents the volume of NaOH standard solution consumed by titration, mL.

Test method for the content and conversion rate of chlorobenzene/o-dichlorobenzene in hydrogen chloride is as follows:

(1) Detection Principle:
Hydrochloric acid containing chlorobenzene/o-dichlorobenzene is adsorbed on an activated carbon packed column, and then the activated carbon is placed in warm ethanol to desorb chlorobenzene/o-dichlorobenzene. The concentration of chlorobenzene/o-dichlorobenzene in ethanol is determined by gas chromatography; the total amount of chlorobenzene/o-dichlorobenzene can then be calculated. The ratio between the total amount of chlorobenzene/o-dichlorobenzene and the total amount of hydrogen chloride entering into the activated carbon packed column is the content of chlorobenzene/o-dichlorobenzene in hydrogen chloride.

The contents of chlorobenzene/o-dichlorobenzene in hydrogen chloride before and after the reaction are compared, the conversion rate of chlorobenzene/o-dichlorobenzene in hydrogen chloride can be calculated.

(2) Analysis and Detection Process
A) A 100 ml empty glass column is taken and filled with at least 60 ml of activated carbon particles. The hydrogen chloride gas containing chlorobenzene/o-dichlorobenzene at a flow rate F is passed through an activated carbon packed column, duration time is t. F is generally controlled at 10-100 ml/min, and t is generally controlled at 20-40 minutes.

B) All the activated carbons after adsorption are transferred into ethanol at 30-50° C. and are soaked for at least 30 minutes, the activated carbons are filtered out; the activated carbons filtered out are transferred into fresh ethanol at 30-50° C. again, and this process is repeated three times; the initial weights of ethanol $m_1$, $m_2$, $m_3$ of the three times are recorded, respectively. The ethanol filtered out is analyzed by gas chromatography for the mass concentration of chlorobenzene/o-dichlorobenzene, the concentrations are denoted as $c_1$, $c_2$ and $c_3$, respectively.

(3) Calculation of the Content of Chlorobenzene/o-Dichlorobenzene in Hydrogen Chloride $$C_1 = \frac{\sum (m_i \cdot c_i)}{F \cdot t}$$

(1) Calculation of the Conversion Rate of Chlorobenzene/o-Dichlorobenzene in Hydrogen Chloride $$C_{onv} = \frac{C_0 - C_1}{C_0} \times 100\%$$

wherein
$C_1$ represents the content of chlorobenzene/o-dichlorobenzene in hydrogen chloride after the reaction;
$C_0$ represents the content of chlorobenzene/o-dichlorobenzene in hydrogen chloride before the reaction;

The powder particle size is measured using a HELOS/BF laser particle sizer, Sympatec, Germany.

Preparation of Powder A 62 kg of copper nitrate ($Cu(NO_3)_2 \cdot 6H_2O$, 295.56), 49 kg of manganese nitrate ($Mn(NO_3)_2 \cdot 4H_2O$, 250) aqueous solution with a mass concentration of 50% were weighted and put into 100 kg of deionized water, then the pH was adjusted to 0.3 with 1 mol·$L^{-1}$ nitric acid solution. After complete dissolution was determined visually, 95 kg of HY molecular sieve (specific surface area: 300 $m^2$/g, average particle size: 1 μm) (Zibo Jinqi Chemical Technology Co., Ltd.) was continuously added. The mixture was continuously stirred, and a small spoon was used to sample several times to observe the slurry. If the slurry was not evenly distributed, stir was continued. If the slurry was uniform, the slurry was then fed into a centrifugal spray drying tower at a rate of 15 L/h using a twin-screw pump. Following the spray drying tower, the materials were collected using a cyclone separator and a bag-type dust collector. All the collected materials were calcined in a muffle furnace. The heating rate of the muffle furnace was 2° C./min, the calcination temperature was 500° C., and the calcination time was about 1 hour, then the calcined materials were cooled, ground to obtain 104.6 kg of Powder A. The obtained Powder A was placed in an environment with 28% of relative humidity for later use. The powder was marked as Powder A-1. The average particle size of Powder A-1 was 28 μm (HELOS/BF laser particle sizer, Sympatec, Germany).

32 kg of copper nitrate ($Cu(NO_3)_2 \cdot 6H_2O$, 295.56), 35.2 kg of manganese nitrate ($Mn(NO_3)_2 \cdot 4H_2O$, 250) aqueous solution with a mass concentration of 50% were weighted and put into 130 kg of deionized water, then the pH was adjusted to 0.3 with 1 mol·$L^{-1}$ nitric acid solution. After complete dissolution was determined visually, 90 kg of HZSM-5 molecular sieve (specific surface area: 600 $m^2$/g, average particle size: 0.1 μm) (Tianjin Nanhua Catalyst Co., Ltd.) was continuously added. The mixture was continuously stirred, and a small spoon was used to sample several times to observe the slurry. If the slurry was not evenly distributed, stir was continued. If the slurry was uniform, the slurry was then fed into a centrifugal spray drying tower by using a twin-screw pump, at a rate of 15 L/h. Following the spray drying tower, the materials were collected using a cyclone separator and a bag-type dust collector. All the collected materials were calcined in a muffle furnace. The heating rate of the muffle furnace was 2° C./min, the calcination temperature was 500° C., and the calcination time was about 1 hour, then the calcined materials were cooled, ground to obtain 95.4 kg of Powder A. The obtained Powder A was placed under an environment with 28% of relative humidity, and set aside. The powder was marked as Powder A-2. The average particle size of Powder A-2 was 35 μm.

110 kg of copper nitrate ($Cu(NO_3)_2.6H_2O$, 295.56), 80 kg of manganese nitrate ($Mn(NO_3)_2.4H_2O$, 250) aqueous solution with a mass concentration of 50% were weighted and put into 150 kg of deionized water, then the pH was adjusted to 0.3 with 1 mol·L$^1$ nitric acid solution. After complete dissolution was determined visually, 72 kg of HY molecular sieve (specific surface area: 400 m$^2$/g, average particle size: 0.5 μm) (Zibo Jinqi Chemical Technology Co., Ltd.) was continuously added. The mixture was continuously stirred, and a small spoon was used to sample several times to observe the slurry. If the slurry was not evenly distributed, stir was continued. If the slurry was uniform, the slurry was then fed into a centrifugal spray drying tower at a rate of 15 L/h using a twin-screw pump. Following the spray drying tower, the materials were collected using a cyclone separator and a bag-type dust collector. All the collected materials were calcined in a muffle furnace. The heating rate of the muffle furnace was 2° C./min, the calcination temperature was 500° C., and the calcination time was about 1 hour, then the calcined materials were cooled, suitably ground to obtain 101.3 kg of Powder A. The obtained Powder A was placed under an environment with 28% of relative humidity, and set aside. The powder was marked as Powder A-3. The average particle size of Powder A-3 was 30 μm.

Preparation of Powder B 1.34 kg of potassium chloride (KCl, 74.55), 1.1 kg of cerium nitrate ($Ce(NO_3)_3.6H_2O$, 434.12), 1.1 kg of lanthanum nitrate ($La(NO_3)_3.6H_2O$, 432.905), 1.0 kg of boric acid ($H_3BO_3$, 61.83) were weighted and put into 30 kg of deionized water, then the pH was adjusted to 0.3 with 1 mol·L$^{-1}$ nitric acid solution. After complete dissolution was determined visually, 30.3 kg of Powder A-1 was continuously added. The mixture was continuously stirred, and a small spoon was used to sample several times to observe the slurry. If the slurry was not evenly distributed, stir was continued. If the slurry was uniform, the slurry was then fed into a centrifugal spray drying tower at a rate of 15 L/h using a twin-screw pump. Following the spray drying tower, the materials were collected using a cyclone separator and a bag-type dust collector. All the collected materials were calcined in a muffle furnace. The heating rate of the muffle furnace was 2° C./min, the calcination temperature was 500° C., and the calcination time was about 1 hour, then the calcined materials were cooled to obtain 24.2 kg of Powder B. The obtained Powder B was placed in an environment with 28% of relative humidity for later use. The powder was marked as Powder B-11. The average particle size of Powder B-11 was 45 μm.

6.53 kg of potassium chloride (KCl, 74.55), 6.7 kg of cerium nitrate ($Ce(NO_3)_3.6H_2O$, 434.12), 6.7 kg of lanthanum nitrate ($La(NO_3)_3.6H_2O$, 432.9055), 4.92 kg of boric acid ($H_3BO_3$, 61.83) were weighted and put into 60 kg of deionized water, then the pH was adjusted to 0.3 with 1 mol·L$^{-1}$ nitric acid solution. After complete dissolution was determined visually, 30.1 kg of Powder A-1 was continuously added. The mixture was continuously stirred, and a small spoon was used to sample several times to observe the slurry. If the slurry was not evenly distributed, stir was continued. If the slurry was uniform, the slurry was then fed into a centrifugal spray drying tower at a rate of 15 L/h using a twin-screw pump. Following the spray drying tower, the materials were collected using a cyclone separator and a bag-type dust collector. All the collected materials were calcined in a muffle furnace. The heating rate of the muffle furnace was 2° C./min, the calcination temperature was 500° C., and the calcination time was about 1 hour, then the calcined materials were cooled to obtain 29.6 kg of Powder B. The obtained Powder B was placed in an environment with 28% of relative humidity, and set aside. The powder was marked as Powder B-12. The average particle size of Powder B-12 was 48 μm.

1.34 kg of potassium chloride (KCl, 74.55), 1.1 kg of cerium nitrate ($Ce(NO_3)_3.6H_2O$, 434.12), 1.11 kg of lanthanum nitrate ($La(NO_3)_3.6H_2O$, 432.9055), 1.0 kg of boric acid ($H_3BO_3$, 61.83) were weighted and put into 30 kg of deionized water, then the pH was adjusted to 0.3 with 1 mol·L$^{-1}$ nitric acid solution. After complete dissolution was determined visually, 30.1 kg of Powder A-2 was continuously added. The mixture was continuously stirred, and a small spoon was used to sample several times to observe the slurry. If the slurry was not evenly distributed, stir was continued. If the slurry was uniform, the slurry was then fed into a centrifugal spray drying tower at a rate of 15 L/h using a twin-screw pump. Following the spray drying tower, the materials were collected using a cyclone separator and a bag-type dust collector. All the collected materials were calcined in a muffle furnace. The heating rate of the muffle furnace was 2° C./min, the calcination temperature was 500° C., and the calcination time was about 1 hour, then the calcined materials were cooled to obtain 23.5 kg of Powder B. The obtained Powder B was placed in an environment with 28% of relative humidity for later use. The powder was marked as Powder B-21. The average particle size of Powder B-21 was 42 μm.

6.55 kg of potassium chloride (KCl, 74.55), 6.7 kg of cerium nitrate ($Ce(NO_3)_3.6H_2O$, 434.12), 6.7 kg of lanthanum nitrate ($La(NO_3)_3.6H_2O$, 432.9055), 4.91 kg of boric acid ($H_3BO_3$, 61.83) were weighted and put into 60 kg of deionized water, then the pH was adjusted to 0.3 with 1 mol·L$^{-1}$ nitric acid solution. After complete dissolution was determined visually, 30.3 kg of Powder A-2 was continuously added. The mixture was continuously stirred, and a small spoon was used to sample several times to observe the slurry. If the slurry was not evenly distributed, stir was continued. If the slurry was uniform, the slurry was then fed into a centrifugal spray drying tower at a rate of 15 L/h using a twin-screw pump. Following the spray drying tower, the materials were collected using a cyclone separator and a bag-type dust collector. All the collected materials were calcined in a muffle furnace. The heating rate of the muffle furnace was 2° C./min, the calcination temperature was 500° C., and the calcination time was about 1 hour, then the calcined materials were cooled to obtain 29.6 kg of Powder B. The obtained Powder B was placed in an environment with 28% of relative humidity, and set aside. The powder was marked as Powder B-22. The average particle size of Powder B-22 was 40 μm.

1.33 kg of potassium chloride (KCl, 74.55), 1.1 kg of cerium nitrate ($Ce(NO_3)_3.6H_2O$, 434.12), 1.09 kg of lanthanum nitrate ($La(NO_3)_3.6H_2O$, 432.9055), 1.03 kg of boric acid ($H_3BO_3$, 61.83) were weighted and put into 30 kg of deionized water, then the pH was adjusted to 0.3 with 1 mol·L$^{-1}$ nitric acid solution. After complete dissolution was determined visually, 30.1 kg of Powder A-3 was continuously added. The mixture was continuously stirred, and a small spoon was used to sample several times to observe the slurry. If the slurry was not evenly distributed, stir was continued. If the slurry was uniform, the slurry was then fed into a centrifugal spray drying tower at a rate of 15 L/h using a twin-screw pump. Following the spray drying tower, the materials were collected using a cyclone separator and a bag-type dust collector. All the collected materials were calcined in a muffle furnace. The heating rate of the muffle furnace was 2° C./min, the calcination temperature was 500° C., and the calcination time was about 1 hour, then the calcined materials were cooled to obtain 24.2 kg of Powder B. The obtained Powder B was placed in an environment with 28% of relative humidity, and set aside. The powder was marked as Powder B-31. The average particle size of Powder B-31 was 52 μm.

6.54 kg of potassium chloride (KCl, 74.55), 6.76 kg of cerium nitrate ($Ce(NO_3)_3 \cdot 6H_2O$, 434.12), 6.71 kg of lanthanum nitrate ($La(NO_3)_3 \cdot 6H_2O$, 432.9055), 4.94 kg of boric acid ($H_3BO_3$, 61.83) were weighted and put into 60 kg of deionized water, then the pH was adjusted to 0.3 with 1 $mol \cdot L^{-1}$ nitric acid solution. After complete dissolution was determined visually, 30.3 kg of Powder A-3 was continuously added. The mixture was continuously stirred, and a small spoon was used to sample several times to observe the slurry. If the slurry was not evenly distributed, stir was continued. If the slurry was uniform, the slurry was then fed into a centrifugal spray drying tower at a rate of 15 L/h using a twin-screw pump. Following the spray drying tower, the materials were collected using a cyclone separator and a bag-type dust collector. All the collected materials were calcined in a muffle furnace. The heating rate of the muffle furnace was 2° C./min, the calcination temperature was 500° C., and the calcination time was about 1 hour, then the calcined materials were cooled to obtain 29.6 kg of Powder B. The obtained Powder B was placed in an environment with 28% of relative humidity, and set aside. The powder was marked as Powder B-32. The average particle size of Powder B-32 was 47 μm.

Preparation of Powder C 2.17 kg of iron nitrate ($Fe(NO_3)_3 \cdot 9H_2O$, 404.02) was put into 3.5 kg of water and the mixture was stirred until iron nitrate was completely dissolved; 1.11 kg of ammonium dihydrogen phosphate ($NH_4H_2PO_4$, 132.97) was put into 2.0 kg of water and the mixture was stirred until ammonium dihydrogen phosphate was completely dissolved, then the solution was slowly added to the iron nitrate aqueous solution, the mixture was continuously stirred for 30 minutes, then the precipitate was removed and placed in an oven at 90° C. for 1 hour. Then the precipitate was calcined using a muffle furnace. The heating rate of the muffle furnace was 2° C./min and the calcination temperature was 600° C. The calcination time was about 1 hour, then the calcined materials were cooled to obtain 2.0 kg of iron phosphate powder, the power was placed in an environment with 28% of relative humidity for later use.

0.93 kg of copper nitrate ($Cu(NO_3)_2 \cdot 6H_2O$, 295.56), 16 kg of manganese nitrate aqueous solution with the mass concentration of 50% and 1.54 kg of chromium nitrate ($Cr(NO_3)_3 \cdot 9H_2O$, 399.99) were weighed and put into 15 kg of deionized water, then the pH was adjusted to 0.3 with 1 $mol \cdot L^{-1}$ nitric acid solution. After complete dissolution was determined visually, 12 kg of titanium dioxide ($TiO_2$, 79.88, average particle size: 0.1 μm) and 500 g of iron phosphate ($FePO_4$, 150.82, average particle size: 20 μm) were continuously added. The mixture was stirred continuously, and a small spoon was used to sample several times to observe the slurry. If the slurry was not evenly distributed, stir was continued. If the slurry was uniform, the slurry was then fed into a centrifugal spray drying tower at a rate of 15 L/h using a twin-screw pump. Following the spray drying tower, the materials were collected using a cyclone separator and a bag-type dust collector. All the collected materials were calcined in a muffle furnace. The heating rate of the muffle furnace was 2° C./min, the calcination temperature was 600° C., and the calcination time was about 1 hour, then the calcined materials were cooled to obtain 10.5 kg of Powder C. The Powder C was placed in an environment with 28% of relative humidity for later use. The powder was marked as Powder C-1. The average particle size of Powder C-1 was 25 μm.

155 g of copper nitrate ($Cu(NO_3)_2 \cdot 6H_2O$, 295.56), 13 kg of manganese nitrate aqueous solution with a mass concentration of 50% and 256 kg of chromium nitrate ($Cr(NO_3)_3 \cdot 9H_2O$, 399.99) were weighed and put into 15 kg of deionized water, then the pH was adjusted to 0.3 with 1 $mol \cdot L^{-1}$ nitric acid solution. After complete dissolution was determined visually, 16 kg of titanium dioxide ($TiO_2$, 79.88, average particle size: 1.0 μm) and 500 g of iron phosphate ($FePO_4$, 150.82, average particle size: 20 μm) were continuously added. The mixture was stirred continuously, and a small spoon was used to sample several times to observe the slurry. If the slurry was not evenly distributed, stir was continued. If the slurry was uniform, the slurry was then fed into a centrifugal spray drying tower at a rate of 15 L/h using a twin-screw pump. Following the spray drying tower, the materials were collected using a cyclone separator and a bag-type dust collector. All the collected materials were calcined in a muffle furnace. The heating rate of the muffle furnace was 2° C./min, the calcination temperature was 600° C., and the calcination time was about 1 hour, then the calcined materials were cooled to obtain 14.2 kg of Powder C. The Powder C was placed in an environment with 28% of relative humidity for later use. The powder was marked as Powder C-2. The average particle size of Powder C-2 was 18 μm.

Example 1

Preparation of Catalyst:

At room temperature (about 25° C.), 3.0 kg of Powder B-11, 2.5 kg of Powder C-1 and 4.0 kg of α-alumina powder (Zibo Shuoren Alumina Science and Technology Co., Ltd.) were taken and mixed well then were added to 26 kg of deionized water being stirred. Then, 1.0 kg of pseudoboehmite (Zibo Jinqi Chemical Technology Co., Ltd., particle size: 0.1-2.0 μm, solid content: 65 wt %, the same hereinafter), 1.0 kg of aluminum sol with a concentration of 20 wt % (Zibo Jinqi Chemical Technology Co., Ltd.) and 1.0 kg of silica sol with a concentration of 20 wt % (Shandong Baite New Material Co., Ltd.) were slowly added, and dilute nitric acid was slowly added finally, the pH of the materials was controlled to be 0.3. The temperature of the materials during the entire mixing process was controlled at 35-40° C. 30 minutes later, the viscosity of the slurry was determined to be 2362 mPa·s. The mixed slurry was fed into a centrifugal spray drying tower at a rate of 15 L/h using a twin-screw pump. Following the spray drying tower, the materials were collected using a cyclone separator and a bag-type dust collector. All the collected materials were calcined in a small-scale rotary kiln. The heating rate of the materials was 3° C./min, the maximum calcination temperature was 500° C., and the residence time of the materials in the high temperature section was approximately 3 hours. Finally, 8.3 kg of catalyst product was obtained.

Catalyst Performance Test:

1 kg of the catalyst was placed in a fluidized bed reactor having an inner diameter of 30 mm and a height of 700 mm, the catalyst bed was preheated to 280° C. with air preheated to about 300° C., and 4 L/min of hydrogen chloride gas (containing chlorobenzene of 990 mg/Nm$^3$) and 2 L/min of oxygen were introduced, the molar ratio of hydrogen chloride to oxygen was 2:1; the mass space velocity of hydrogen chloride was 0.39 gHCl/(gcat×h), the reaction pressure was adjusted to 0.3 MPa (absolute pressure), the hot-spot temperature was adjusted to 400-420° C., the reaction was conducted continuously for 100 h. The average conversion rate of HCl was measured to be 81.5%, the average conversion rate of chlorobenzene was 98.6%, 212 mg of hexachlorobenzene and 23 mg of pentachlorobenzene were collected.

Example 2

Preparation of Catalyst:

At room temperature (about 25° C.), 4.0 kg of Powder B-11, 3.5 kg of Powder C-2, 3.0 kg of α-alumina powder (Zibo Shuoren Alumina Science and Technology Co., Ltd.) and 800 g of carbon black (Changzhou Fengshuo Chemical Co., Ltd.) were taken and mixed well then were added to 26 kg of deionized water being stirred. Then, 400 g of pseudo-boehmite (Zibo Jinqi Chemical Technology Co., Ltd.), 6.0 kg of aluminum sol with a concentration of 20 wt % (Zibo Jinqi Chemical Technology Co., Ltd.) and 2.0 kg of silica sol with a concentration of 20 wt % (Shandong Baite New Material Co., Ltd.) were slowly added, and dilute nitric acid was slowly added finally, the pH of the materials was controlled to be 0.3. The temperature of the materials during the entire mixing process was controlled at 35-40° C. 30 minutes later, the viscosity of the slurry was determined to be 5823 mPa·s. The mixed slurry was fed into a centrifugal spray drying tower at a rate of 15 L/h using a twin-screw pump. Following the spray drying tower, the materials were collected using a cyclone separator and a bag-type dust collector. All the collected materials were calcined in a small-scale rotary kiln. The heating rate of the materials was 3° C./min, the maximum calcination temperature was 500° C., and the residence time of the materials in the high temperature section was approximately 3 hours. Finally, 9.1 kg of catalyst product was obtained.

Catalyst Performance Test:

1 kg of the catalyst was placed in a fluidized bed reactor having an inner diameter of 30 mm and a height of 700 mm, the catalyst bed was preheated to 280° C. with air preheated to about 300° C. and 3 L/min of hydrogen chloride gas (containing chlorobenzene of 990 mg/Nm$^3$) and 1.5 L/min of oxygen were introduced, the molar ratio of hydrogen chloride to oxygen was 2:1; the mass space velocity of hydrogen chloride was 0.29 gHCl/(gcat×h), the reaction pressure was adjusted to 0.3 MPa (absolute pressure), the hot-spot temperature was adjusted to 400-420° C., the reaction was conducted continuously for 100 h. The average conversion rate of HCl was measured to be 83.7%, the average conversion rate of chlorobenzene was 99.1%, 101 mg of hexachlorobenzene and 14 mg of pentachlorobenzene were collected.

Example 3

Preparation of Catalyst:

At room temperature (about 25° C.), 2.0 kg of Powder B-12, 3.5 kg of Powder C-1, 4.0 kg of α-alumina powder (Zibo Shuoren Alumina Science and Technology Co., Ltd.) and 3.0 kg of kaolin (Jinan Bofa Chemical Raw Materials Co., Ltd.) were taken and mixed well then were added to 20 kg of deionized water being stirred. Then, 400 g of pseudo-boehmite (Zibo Jinqi Chemical Technology Co., Ltd.), 7.5 kg of aluminum sol with a concentration of 20 wt % (Zibo Jinqi Chemical Technology Co., Ltd.) and 2.5 kg of silica sol with a concentration of 20 wt % (Shandong Baite New Material Co., Ltd.) were slowly added, and dilute nitric acid was slowly added finally, the pH of the materials was controlled to be 0.3. The temperature of the materials during the entire mixing process was controlled at 35-40° C. 30 minutes later, the viscosity of the slurry was determined to be 5341 mPa·s. The mixed slurry was fed into a centrifugal spray drying tower at a rate of 15 L/h using a twin-screw pump. Following the spray drying tower, the materials were collected using a cyclone separator and a bag-type dust collector. All the collected materials were calcined in a small-scale rotary kiln. The heating rate of the materials was 3° C./min, the maximum calcination temperature was 500° C., and the residence time of the materials in the high temperature section was approximately 3 hours. Finally, 12.2 kg of catalyst product was obtained.

Catalyst Performance Test:

1 kg of the catalyst was placed in a fluidized bed reactor having an inner diameter of 30 mm and a height of 700 mm, the catalyst bed was preheated to 280° C. with air preheated to about 300° C. and 2 L/min of hydrogen chloride gas (containing o-dichlorobenzene of 974 mg/Nm$^3$) and 2 L/min of oxygen were introduced, the molar ratio of hydrogen chloride to oxygen was 1:1; the mass space velocity of hydrogen chloride was 0.20 gHCl/(gcat×h), the reaction pressure was adjusted to 0.3 MPa (absolute pressure), the hot-spot temperature was adjusted to 400-420° C., the reaction was conducted continuously for 100 h. The average conversion rate of HCl was measured to be 84.7%, the average conversion rate of o-dichlorobenzene was 98.3%, 119 mg of hexachlorobenzene and 8 mg of pentachlorobenzene were collected.

Example 4

Preparation of Catalyst:

At room temperature (about 25° C.), 3.0 kg of Powder B-12, 2.0 kg of Powder C-2, 2.5 kg of α-alumina powder (Zibo Shuoren Alumina Science and Technology Co., Ltd.) and 1.0 kg of kaolin (Jinan Bofa Chemical Raw Materials Co., Ltd.) were taken and mixed well then were added to 23 kg of deionized water being stirred. Then, 500 g of pseudo-boehmite (Zibo Jinqi Chemical Technology Co., Ltd.), 3.0 kg of aluminum sol with a concentration of 20 wt % (Zibo Jinqi Chemical Technology Co., Ltd.) and 2.5 kg of silica sol with a concentration of 20 wt % (Shandong Baite New Material Co., Ltd.) were slowly added, and dilute nitric acid was slowly added finally, the pH of the materials was controlled to be 0.3. The temperature of the materials during the entire mixing process was controlled at 35-40° C. 30 minutes later, the viscosity of the slurry was determined to be 4093 mPa·s. The mixed slurry was fed into a centrifugal spray drying tower at a rate of 15 L/h using a twin-screw pump. Following the spray drying tower, the materials were collected using a cyclone separator and a bag-type dust collector. All the collected materials were calcined in a small-scale rotary kiln. The heating rate of the materials was 3° C./min, the maximum calcination temperature was 500° C., and the residence time of the materials in the high temperature section was approximately 3 hours. Finally, 7.3 kg of catalyst product was obtained.

Catalyst Performance Test:

1 kg of the catalyst was placed in a fluidized bed reactor having an inner diameter of 30 mm and a height of 700 mm, the catalyst bed was preheated to 280° C. with air preheated to about 300° C. and 3 L/min of hydrogen chloride gas (containing chlorobenzene of 990 mg/Nm$^3$) and 1.5 L/min of oxygen were introduced, the molar ratio of hydrogen chloride to oxygen was 2:1; the mass space velocity of hydrogen chloride was 0.29 gHCl/(gcat×h), the reaction pressure was adjusted to 0.3 MPa (absolute pressure), the hot-spot temperature was adjusted to 400-420° C., the reaction was conducted continuously for 100 h. The average conversion rate of HCl was measured to be 82.9%, the average conversion rate of chlorobenzene was 96.9%, 162 mg of hexachlorobenzene and 42 mg of pentachlorobenzene were collected.

Example 5

Preparation of Catalyst:

At room temperature (about 25° C.), 2.0 kg of Powder B-21, 4.0 kg of Powder C-1 and 4.0 kg of α-alumina powder (Zibo Shuoren Alumina Science and Technology Co., Ltd.) were taken and mixed well then were added to 36 kg of deionized water being stirred. Then, 2.0 kg of pseudoboehmite (Zibo Jinqi Chemical Technology Co., Ltd.), 3.0 kg of aluminum sol with a concentration of 20 wt % (Zibo Jinqi Chemical Technology Co., Ltd.) and 3.5 kg of silica sol with a concentration of 20 wt % (Shandong Baite New Material Co., Ltd.) were carefully added, and dilute nitric acid was slowly added finally, the pH of the materials was controlled to be 0.3. The temperature of the materials during the entire mixing process was controlled at 35-40° C. 30 minutes later, the viscosity of the slurry was determined to be 1825 mPa·s. The mixed slurry was fed into a centrifugal spray drying tower at a rate of 15 L/h using a twin-screw pump. Following the spray drying tower, the materials were collected using a cyclone separator and a bag-type dust collector. All the collected materials were calcined in a small-scale rotary kiln. The heating rate of the materials was 3° C./min, the maximum calcination temperature was 500° C., and the residence time of the materials in the high temperature section was approximately 3 hours. Finally, 10.2 kg of catalyst product was obtained.

Catalyst Performance Test:

1 kg of the catalyst was placed in a fluidized bed reactor having an inner diameter of 30 mm and a height of 700 mm, the catalyst bed was preheated to 280° C. with air preheated to about 300° C. and 10 L/min of hydrogen chloride gas (containing chlorobenzene of 990 mg/Nm$^3$) and 10 L/min of oxygen were introduced, the molar ratio of hydrogen chloride to oxygen was 1:1; the mass space velocity of hydrogen chloride was 0.98 gHCl/(gcat×h), the reaction pressure was adjusted to 0.3 MPa (absolute pressure), the hot-spot temperature was adjusted to 400-420° C., the reaction was conducted continuously for 100 h. The average conversion rate of HCl was measured to be 82.3%, the average conversion rate of chlorobenzene was 97.0%, 802 mg of hexachlorobenzene and 93 mg of pentachlorobenzene were collected.

Example 6

Preparation of Catalyst:

At room temperature (about 25° C.), 2.5 kg of Powder B-22, 3.0 kg of Powder C-2, 5.0 kg of α-alumina powder (Zibo Shuoren Alumina Science and Technology Co., Ltd.) and 300 g of Y molecular sieve (Zibo Jinqi Chemical Technology Co., Ltd.) were taken and mixed well then were added to 25 kg of deionized water being stirred. Then, 1.4 kg of pseudoboehmite (Zibo Jinqi Chemical Technology Co., Ltd.), 3.0 kg of aluminum sol with a concentration of 20 wt % (Zibo Jinqi Chemical Technology Co., Ltd.) and 1.5 kg of silica sol with a concentration of 20 wt % (Shandong Baite New Material Co., Ltd.) were slowly added, and dilute nitric acid was slowly added finally, the pH of the materials was controlled to be 0.3. The temperature of the materials during the entire mixing process was controlled at 35-40° C. 30 minutes later, the viscosity of the slurry was determined to be 3864 mPa·s. The mixed slurry was fed into a centrifugal spray drying tower at a rate of 15 L/h using a twin-screw pump. Following the spray drying tower, the materials were collected using a cyclone separator and a bag-type dust collector. All the collected materials were calcined in a small-scale rotary kiln. The heating rate of the materials was 3° C./min, the maximum calcination temperature was 500° C., and the residence time of the materials in the high temperature section was approximately 3 hours. Finally, 10.1 kg of catalyst product was obtained.

Catalyst Performance Test:

1 kg of the catalyst was placed in a fluidized bed reactor having an inner diameter of 30 mm and a height of 700 mm, the catalyst bed was preheated to 280° C. with air preheated to about 300° C. and 2 L/min of hydrogen chloride gas (containing chlorobenzene of 990 mg/Nm$^3$) and 1 L/min of oxygen were introduced, the molar ratio of hydrogen chloride to oxygen was 2:1; the mass space velocity of hydrogen chloride was 0.20 gHCl/(gcat×h), the reaction pressure was adjusted to 0.3 MPa (absolute pressure), the hot-spot temperature was adjusted to 400-420° C., the reaction was conducted continuously for 100 h. The average conversion rate of HCl was measured to be 80.2%, the average conversion rate of chlorobenzene was 99.5%, 69 mg of hexachlorobenzene and 4 mg of pentachlorobenzene were collected.

Example 7

Preparation of Catalyst:

At room temperature (about 25° C.), 3.0 kg of Powder B-31, 4.0 kg of Powder C-2, 3.0 kg of α-alumina powder (Zibo Shuoren Alumina Science and Technology Co., Ltd.) and 3.0 kg of Y molecular sieve (Zibo Jinqi Chemical Technology Co., Ltd.) were taken and mixed well then were added to 35 kg of deionized water being stirred. Then, 2.0 kg of pseudoboehmite (Zibo Jinqi Chemical Technology Co., Ltd.), 4.0 kg of aluminum sol with a concentration of 20 wt % (Zibo Jinqi Chemical Technology Co., Ltd.) and 1.5 kg of silica sol with a concentration of 20 wt % (Shandong Baite New Material Co., Ltd.) were slowly added, and dilute nitric acid was slowly added finally, the pH of the materials was controlled to be 0.3. The temperature of the materials during the entire mixing process was controlled at 35-40° C. 30 minutes later, the viscosity of the slurry was determined to be 4028 mPa·s. The mixed slurry was fed into a centrifugal spray drying tower at a rate of 15 L/h using a twin-screw pump. Following the spray drying tower, the materials were collected using a cyclone separator and a bag-type dust collector. All the collected materials were calcined in a small-scale rotary kiln. The heating rate of the materials was 3° C./min, the maximum calcination temperature was 500°

C., and the residence time of the materials in the high temperature section was approximately 3 hours. Finally, 12.5 kg of catalyst product was obtained.

Catalyst Performance Test:

1 kg of the catalyst was placed in a fluidized bed reactor having an inner diameter of 30 mm and a height of 700 mm, the catalyst bed was preheated to 280° C. with air preheated to about 300° C. and 6 L/min of hydrogen chloride gas (containing o-dichlorobenzene 974 mg/Nm$^3$) and 3 L/min of oxygen were introduced, the molar ratio of hydrogen chloride to oxygen was 2:1; the mass space velocity of hydrogen chloride was 0.59 gHCl/(gcat×h), the reaction pressure was adjusted to 0.3 MPa (absolute pressure), the hot-spot temperature was adjusted to 400-420° C., the reaction was conducted continuously for 100 h. The average conversion rate of HCl was measured to be 82.6%, the average conversion rate of o-dichlorobenzene was 98.1%, 360 mg of hexachlorobenzene and 48 mg of pentachlorobenzene were collected.

Example 8

Preparation of Catalyst:

At room temperature (about 25° C.), 5.0 kg of Powder B-31, 4.0 kg of Powder C-2 and 4.0 kg of α-alumina powder (Zibo Shuoren Alumina Science and Technology Co., Ltd.) were taken and mixed well then were added to 22 kg of deionized water being stirred. Then, 680 g of pseudoboehmite (Zibo Jinqi Chemical Technology Co., Ltd.), 10.0 kg of aluminum sol with a concentration of 20 wt % (Zibo Jinqi Chemical Technology Co., Ltd.) and 3.4 kg of silica sol with a concentration of 20 wt % (Shandong Baite New Material Co., Ltd.) were slowly added, and dilute nitric acid was slowly added finally, the pH of the materials was controlled to be 0.3. The temperature of the materials during the entire mixing process was controlled at 35-40° C. 30 minutes later, the viscosity of the slurry was determined to be 8531 mPa·s. The mixed slurry was fed into a centrifugal spray drying tower at a rate of 15 L/h using a twin-screw pump. Following the spray drying tower, the materials were collected using a cyclone separator and a bag-type dust collector. All the collected materials were calcined in a small-scale rotary kiln. The heating rate of the materials was 3° C./min, the maximum calcination temperature was 500° C., and the residence time of the materials in the high temperature section was approximately 3 hours. Finally, 11.6 kg of catalyst product was obtained.

Catalyst Performance Test:

1 kg of the catalyst was placed in a fluidized bed reactor having an inner diameter of 30 mm and a height of 700 mm, the catalyst bed was preheated to 280° C. with air preheated to about 300° C. and 4 L/min of hydrogen chloride gas (containing o-dichlorobenzene 974 mg/Nm$^3$) and 1.33 L/min of oxygen were introduced, the molar ratio of hydrogen chloride to oxygen was 3:1; the mass space velocity of hydrogen chloride was 0.39 gHCl/(gcat×h), the reaction pressure was adjusted to 0.3 MPa (absolute pressure), the hot-spot temperature was adjusted to 400-420° C., the reaction was conducted continuously for 100 h. The average conversion rate of HCl was measured to be 80.2%, the average conversion rate of o-dichlorobenzene was 99.4%, 95 mg of hexachlorobenzene and 11 mg of pentachlorobenzene were collected.

Example 9

Preparation of Catalyst:

At room temperature (about 25° C.), 2.5 kg of Powder B-32, 4.0 kg of Powder C-1 and 4.0 kg of α-alumina powder (Zibo Shuoren Alumina Science and Technology Co., Ltd.) were taken and mixed well then were added to 30 kg of deionized water being stirred. Then, 1.2 kg of pseudoboehmite (Zibo Jinqi Chemical Technology Co., Ltd.), 2.5 kg of aluminum sol with a concentration of 20 wt % (Zibo Jinqi Chemical Technology Co., Ltd.) and 1.5 kg of silica sol with a concentration of 20 wt % (Shandong Baite New Material Co., Ltd.) were slowly added, and then dilute nitric acid was slowly added, the pH of the materials was controlled to be 0.3. The temperature of the materials during the entire mixing process was controlled at 35-40° C. 30 minutes later, the viscosity of the slurry was determined to be 1597 mPa·s. The mixed slurry was fed into a centrifugal spray drying tower at a rate of 15 L/h using a twin-screw pump. Following the spray drying tower, the materials were collected using a cyclone separator and a bag-type dust collector. All the collected materials were calcined in a small-scale rotary kiln. The heating rate of the materials was 3° C./min, the maximum calcination temperature was 500° C., and the residence time of the materials in the high temperature section was approximately 3 hours. Finally, 8.6 kg of catalyst product was obtained.

Catalyst Performance Test:

1 kg of the catalyst was placed in a fluidized bed reactor having an inner diameter of 30 mm and a height of 700 mm, the catalyst bed was preheated to 280° C. with air preheated to about 300° C. and 5 L/min of hydrogen chloride gas (containing chlorobenzene of 990 mg/Nm$^3$) and 2 L/min of oxygen were introduced, the molar ratio of hydrogen chloride to oxygen was 2.5:1; the mass space velocity of hydrogen chloride was 0.49 gHCl/(gcat×h), the reaction pressure was adjusted to 0.3 MPa (absolute pressure), the hot-spot temperature was adjusted to 400-420° C., the reaction was conducted continuously for 100 h. The average conversion rate of HCl was measured to be 83.6%, the average conversion rate of chlorobenzene was 98.8%, 274 mg of hexachlorobenzene and 36 mg of pentachlorobenzene were collected.

| | Compositions of the catalysts/wt % | | | | | | | | | |
|---|---|---|---|---|---|---|---|---|---|---|
| Examples | Cu | Mn | B | Cr | Rare earth | K | Ti | P | Fe | Carrier |
| Example 1 | 3.09 | 3.64 | 0.15 | 0.29 | 0.59 | 0.59 | 10.26 | 0.15 | 0.26 | 80.99 |
| Example 2 | 3.04 | 3.17 | 0.16 | 0.05 | 0.63 | 0.63 | 13.15 | 0.14 | 0.25 | 78.78 |
| Example 3 | 1.19 | 2.87 | 0.23 | 0.29 | 1.17 | 0.93 | 10.27 | 0.15 | 0.26 | 82.64 |
| Example 4 | 2.05 | 2.30 | 0.52 | 0.03 | 2.61 | 2.07 | 9.96 | 0.11 | 0.19 | 80.14 |
| Example 5 | 1.31 | 3.88 | 0.08 | 0.38 | 0.33 | 0.33 | 13.74 | 0.20 | 0.35 | 79.39 |
| Example 6 | 0.83 | 2.19 | 0.34 | 0.04 | 1.71 | 1.36 | 11.76 | 0.13 | 0.23 | 81.42 |
| Example 7 | 3.58 | 3.23 | 0.10 | 0.04 | 0.41 | 0.40 | 12.84 | 0.14 | 0.25 | 79.00 |

-continued

Compositions of the catalysts/wt %

| Examples | Cu | Mn | B | Cr | Rare earth | K | Ti | P | Fe | Carrier |
|---|---|---|---|---|---|---|---|---|---|---|
| Example 8 | 5.68 | 3.93 | 0.16 | 0.04 | 0.65 | 0.64 | 12.27 | 0.13 | 0.24 | 76.27 |
| Example 9 | 2.95 | 4.45 | 0.36 | 0.40 | 1.79 | 1.41 | 14.34 | 0.20 | 0.37 | 73.72 |

Comparative Example 1

Please refer to Example 4 in CN201010567038.9.

2.63 kg of copper chloride ($CuCl_2 \cdot 2H_2O$) was taken and dissolved in 4 L of deionized water, then 6 kg of HY molecular sieve was added, the mixture was well stirred then was stewed for 12 hours. After being dried at 90° C., a solid was obtained, which was smashed and ground to obtain Powder A-4.

92 g of boric acid ($H_3BO_3$, 61.83), 305 g of potassium chloride (KCl, 74.55), 135 g of manganese nitrate, 815 g of cerium nitrate ($Ce(NO_3)_3 \cdot 6H_2O$, 372.116) and 4.05 g of lanthanum nitrate ($La(NO_3)_3 \cdot 6H_2O$, 432.9055) were taken and dissolved in 25 L of deionized water, then all Powder A-4 was added, 300 g of pseudoboehmite (Zibo Jinqi Chemical Technology Co., Ltd.), 4 kg of aluminum sol with a concentration of 20 wt % (Zibo Jinqi Chemical Technology Co., Ltd.) and 2.5 kg of silica sol with a concentration of 20 wt % (Shandong Baite New Material Co., Ltd.) were slowly added during stirring, and then dilute nitric acid was slowly added, the pH of the materials was controlled to be 0.3. The temperature of the materials during the entire mixing process was controlled at 35-40° C. 30 minutes later, the viscosity of the slurry was determined to be 1362 mPa·s. The mixed slurry was fed into a centrifugal spray drying tower at a rate of 15 L/h using a twin-screw pump. Following the spray drying tower, the materials were collected using a cyclone separator and a bag-type dust collector. All the collected materials were calcined in a small-scale rotary kiln. The heating rate of the materials was 3° C./min, the maximum calcination temperature was 500° C., and the residence time of the materials in the high temperature section was approximately 3 hours. Finally, 7.3 kg of catalyst product was obtained.

Catalyst Performance Test:

1 kg of the catalyst was placed in a fluidized bed reactor having an inner diameter of 30 mm and a height of 700 mm, the catalyst bed was preheated to 280° C. with air preheated to about 300° C. and 5 L/min of hydrogen chloride gas (containing chlorobenzene of 990 mg/Nm³) and 2 L/min of oxygen were introduced, the reaction pressure was adjusted to 0.3 MPa (absolute pressure), the hot-spot temperature was adjusted to 400-420° C., the reaction was conducted continuously for 10 h. The average conversion rate of HCl was measured to be 79.2%, the average conversion rate of chlorobenzene was 96.4%, 5.72 g of hexachlorobenzene, 809 mg of pentachlorobenzene and 140 mg of other chlorobenzenes were collected.

Comparative Example 2

Please refer to Example 1 in CN200910027312.0.

1.74 kg of cerium nitrate ($Ce(NO_3)_3 \cdot 6H_2O$), 550 g of potassium chloride (KCl) and 1.35 kg of copper chloride ($CuCl_2 \cdot 2H_2O$) were taken and dissolved in 20 L of deionized water, then 2.58 kg of manganese nitrate ($Mn(NO_3)_2$) aqueous solution with a concentration of 50% was added. 5.4 kg of ReY molecular sieve (Zibo Jinqi Chemical Technology Co., Ltd.) and 3 kg of silica sol with a concentration of 20 wt % (Shandong Baite New Material Co., Ltd.) were added during stirring. The mixed slurry was fed into a centrifugal spray drying tower at a rate of 15 L/h using a twin-screw pump. Following the spray drying tower, the materials were collected using a cyclone separator and a bag-type dust collector. All the collected materials were calcined in a small-scale rotary kiln. The heating rate of the materials was 3° C./min, the maximum calcination temperature was 500° C., and the residence time of the materials in the high temperature section was approximately 3 hours. Finally, 4.5 kg of catalyst product was obtained.

Catalyst Performance Test:

1 kg of the catalyst was placed in a fluidized bed reactor having an inner diameter of 30 mm and a height of 700 mm, the catalyst bed was preheated to 280° C. with air preheated to about 300° C. and 5 L/min of hydrogen chloride gas (containing chlorobenzene of 990 mg/Nm³) and 2.5 L/min of oxygen were introduced, the reaction pressure was adjusted to 0.3 MPa (absolute pressure), the hot-spot temperature was adjusted to 400-420° C., the reaction was conducted continuously for 10 h. The average conversion rate of HCl was measured to be 78.8%, the average conversion rate of chlorobenzene was 93.2%, 3.25 g of hexachlorobenzene, 461 mg of pentachlorobenzene and 54 mg of other chlorobenzenes were collected.

The invention claimed is:

1. A catalyst for preparing chlorine gas by hydrogen chloride oxidation, wherein the catalyst comprises a copper element, a manganese element, a boron element, a chromium element, a rare-earth element, a potassium element, a titanium element, a phosphorus element, an iron element and a carrier.

2. The catalyst according to claim 1, wherein based on the total mass of the catalyst, the content of each element in the catalyst is: copper, 0.5-20 wt %, preferably 2-10%; manganese, 2-10 wt %, preferably 2-5 wt %; boron, 0.05-2 wt %, preferably 0.06-1.0 wt %; chromium, 0.01-3.0 wt %, preferably 0.02-2.0 wt %; rare-earth metal, 0.1-10 wt %, preferably 0.5-3.0 wt %; potassium, 0.1-10 wt %, preferably 0.2-2.5 wt %; titanium, 3-15 wt %, preferably 4-14 wt %; phosphorus, 0.02-1.1 wt %, preferably 0.03-0.50 wt %; iron, 0.03-1.9 wt %, preferably 0.04-1.0 wt %; the content of the carrier is 55-90 wt %, preferably 70-90 wt %.

3. The catalyst according to claim 1, wherein the rare-earth metal element is one or both of cerium and lanthanum.

4. The catalyst according to claim 1, wherein the carrier is selected from the group consisting of molecular sieves, kaolin, diatomite, silica, alumina, titania, zirconia, activated carbon, silicon carbide, carbon black, carbon fibers and carbon nanotubes, and combinations thereof.

5. A method of preparing chlorine gas by hydrogen chloride oxidation, using the catalyst according to claim 1, preferably
the hydrogen chloride is hydrogen chloride containing chlorobenzene, the hydrogen chloride is hydrogen chloride containing 0-1000 mg/kg of chlorobenzene; the hydrogen chloride is hydrogen chloride containing 100-800 mg/kg of chlorobenzene and/or o-dichlorobenzene.

6. A method of producing a catalyst for preparing chlorine gas by hydrogen chloride oxidation, wherein the method comprises the following steps:
(1) a copper-containing compound and a manganese-containing compound are dissolved in a solvent, a carrier is added, the dissolved compounds and the carrier are thoroughly mixed and infiltrated, then are dried, calcined, cooled and ground to obtain Powder A;
(2) a boron-containing compound, a potassium-containing compound and a rare-earth metal-containing compound are dissolved in a solvent, Powder A obtained in step (1) is added, the dissolved compounds and Powder A are thoroughly mixed and infiltrated, then are dried, calcined, cooled and ground to obtain Powder B;
(3) a copper-containing compound, a chromium-containing compound and a manganese-containing compound are dissolved in a solvent, then titanium dioxide and iron phosphate powder are added, the dissolved compounds, titanium dioxide and iron phosphate powder are thoroughly mixed and infiltrated, then are dried, calcined, cooled and ground to obtain Powder C; and
(4) Powder B, Powder C, a carrier, a binder, and a solvent are mixed evenly, then the obtained mixture are dried, calcined, sieved and cooled to obtain the catalyst.

7. The method according to claim 6, wherein the solvent in step (1), the solvent in step (2) and the solvent in step (3) are all water or dilute nitric acid, the solvent in step (4) is water.

8. The method according to claim 6, wherein the content by weight of each component in step (4) is 5-30 parts of Powder B, 10-30 parts of Powder C, 10-40 parts of the carrier and 10-55 parts of the binder, respectively.

9. The method according to claim 6, wherein the rare-earth metal element is one or both of cerium and lanthanum.

10. The method according to claim 6, wherein the carrier in step (1) is a molecular sieve, and the molecular sieve has a specific surface area of 300-600 m²/g, an average particle size of 0.1-10 μm and a maximum particle size up to 50 μm, preferably the average particle size is 0.5-2 μm and the maximum particle size is up to 10 μm.

11. The method according to claim 6, wherein the carrier in step (1) has a content of 15-100 parts by weight, copper element in the copper-containing compound has a content of 4-8 parts by weight, and manganese element in the manganese-containing compound has a content of 1-10 parts by weight.

12. The method according to claim 6, wherein Powder A in the step (2) has a content of 50-200 parts by weight, boron element in the boron-containing compound has a content of 1-2 parts by weight, potassium element in the potassium-containing compound has a content of 2-10 parts by weight, and rare-earth metal in the rare-earth metal-containing compound has a content of 1-10 parts by weight.

13. The method according to claim 6, wherein the titanium dioxide in step (3) is titanium dioxide having an anatase crystal structure; the titanium dioxide has an average particle size of 0.1-10 μm and a maximum particle size up to 50 μm, preferably the average particle size is 0.2-3 μm and the maximum particle size is up to 15 μm.

14. The method according to claim 6, wherein the iron phosphate in step (3) has an average particle size of 10-100 μm and a maximum particle size up to 500 μm.

15. The method according to claim 6, wherein in step (3), parts by weight of the titanium dioxide, the iron phosphate, copper element in the copper-containing compound, chromium element in the chromium-containing compound and manganese element in the manganese-containing compound are 50-300 parts, 0.1-10 parts, 0.1-2 parts, 0.1-2 parts and 4-30 parts, respectively.

16. The method according to claim 6, wherein the carrier in step (4) is selected from the group consisting of molecular sieves, kaolin, diatomite, silica, alumina, titania, zirconia, activated carbon, silicon carbide, carbon black, carbon fibers and carbon nanotubes, and combinations thereof.

17. The method according to claim 6, wherein the earner in step (4) has an average particle size of 0.1-10 μm and a maximum particle size up to 50 μm, preferably the average particle size is 0.2-3 μm and the maximum particle size is up to 15 μm.

18. The method according to claim 6, wherein the binder in step (4) is selected from the group consisting of aluminum sol, activated aluminum oxide, silica sol, kaolin, clay, pseudoboehmite, silicate ester, titanate ester, potassium water glass (potassium silicate), diatomite, nitric acid and phosphoric acid, and combinations thereof.

19. The method according to claim 6, wherein
in step (1), calcination temperature is 300-650° C., preferably 450-650° C., calcination time is 30-120 minutes;
in step (2), calcination temperature is 300-650° C., preferably 450-650° C., calcination time is 30-120 minutes;
in step (3), calcination temperature is 450-850° C., preferably 550-750° C., calcination time is 60-120 minutes;
in step (4), calcination temperature is 300-650° C., preferably 450-650° C., calcination time is 60-180 minutes.

20. The method according to claim 6, wherein
Powder A in step (1) has an average particle size of 10-100 μm and a maximum particle size up to 500 μm;
Powder B in step (2) has an average particle size of 10-100 μm and a maximum particle size up to 500 μm;
Powder C in step (3) has an average particle size of 10-100 μm and a maximum particle size up to 500 μm.

* * * * *